Oct. 14, 1952 — M. O. TRUDEAU — 2,613,943
CHUCKING DEVICE FOR LATHES
Filed July 20, 1950 — 3 Sheets-Sheet 2

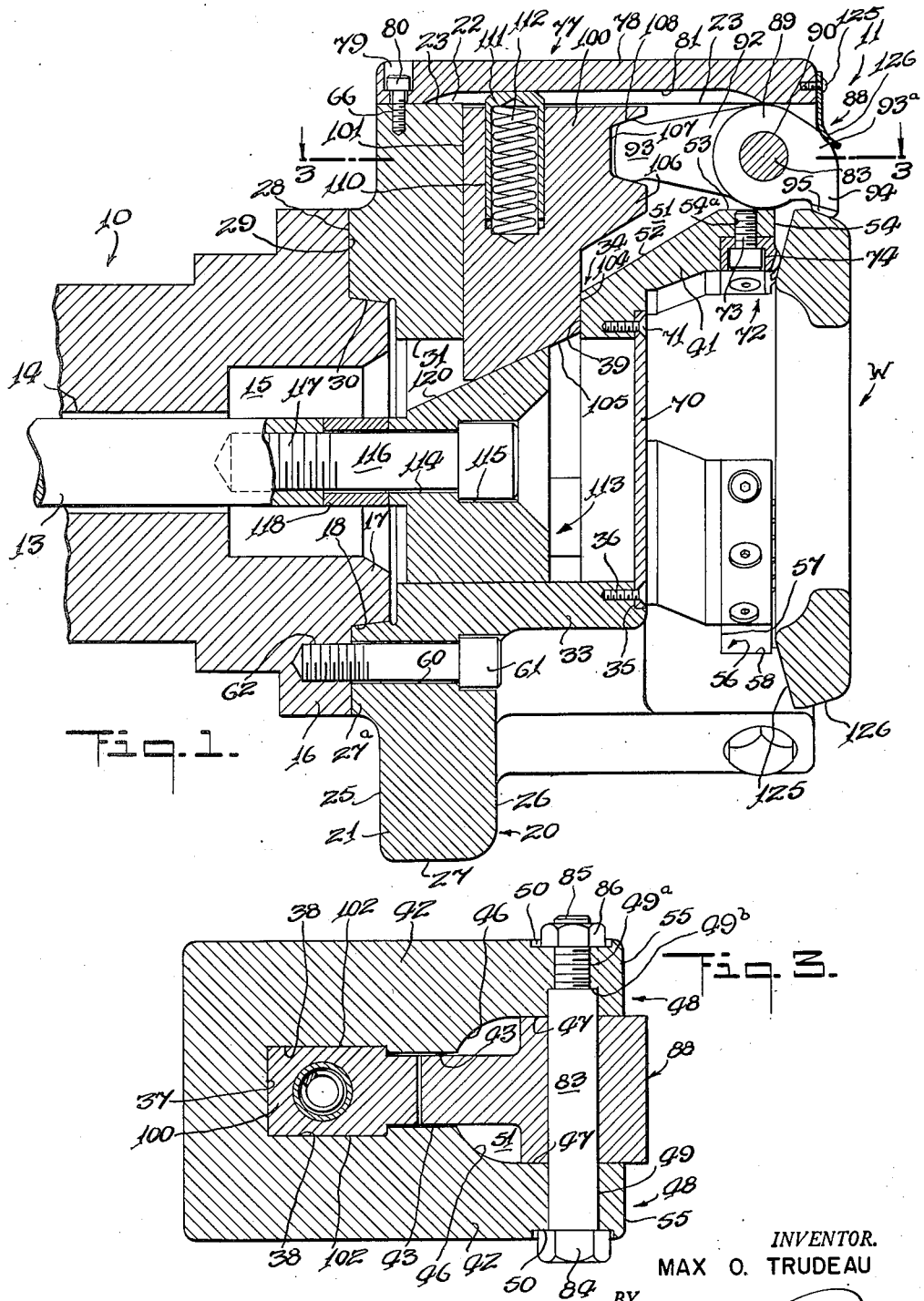

INVENTOR.
MAX O. TRUDEAU
BY
ATTORNEY

Oct. 14, 1952 — M. O. TRUDEAU — 2,613,943
CHUCKING DEVICE FOR LATHES
Filed July 20, 1950 — 3 Sheets-Sheet 3
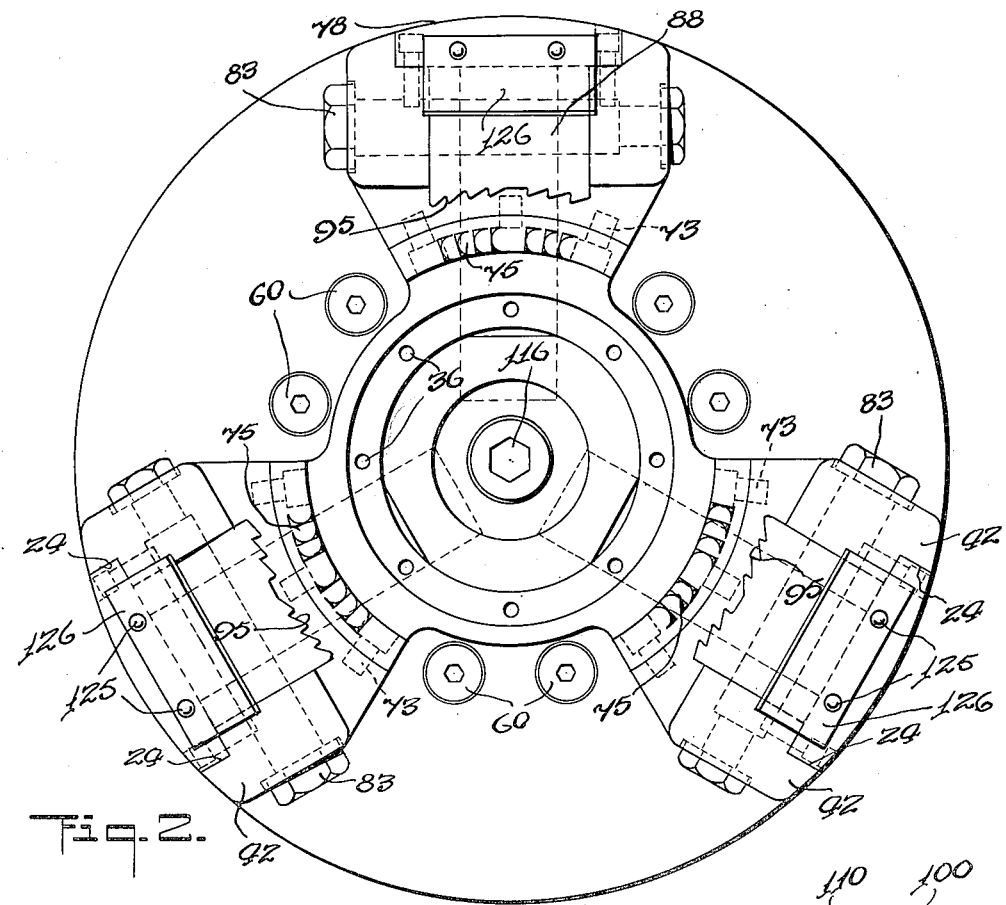
INVENTOR.
MAX O. TRUDEAU
BY
ATTORNEY Patented Oct. 14, 1952

2,613,943

UNITED STATES PATENT OFFICE 2,613,943

CHUCKING DEVICE FOR LATHES

Max O. Trudeau, Jackson Heights, N. Y., assignor to Morey Machinery Co., Inc., Astoria, L. I., N. Y., a corporation of New York Application July 20, 1950, Serial No. 174,858

12 Claims. (Cl. 279—106)

1

This invention relates to chucking devices for lathes. It is particularly directed to a chucking device for chucking annular work pieces such as gear blanks and the like.

An object of the present invention is to provide an improved chucking device of the character described having means for clamping the work piece radially and laterally at the same time, to enable clamping across solid metal rather than exerting the total of the clamping force across the diameter of the work, thereby eliminating distortion.

A further object of this invention is to provide in a chucking device of the character described, a backing for the work piece to take the thrust of the lateral clamping force, said backing comprising arcuate members provided with serrations or teeth which act to clamp as well as rotate the work piece.

Yet a further object of this invention is to provide a chucking device of the character described comprising radially extending cams, a rotatably mounted clamping jaw adapted to be rotated by each cam, and a central operating cone movably axially to simultaneously move the cams for rotating the jaws into engagement with the work piece.

Yet a further object of this invention is to provide a chucking device of the character described including hydraulic means to act on the cams independently of each other for individually rotating the clamping jaws.

Still another object of this invention is to provide a chucking device of the character described comprising a chuck body attachable to the nose of a lathe spindle and rotatable therewith, a plurality of radially movable members, and clamping jaws associated with said radial members respectively, and pivotable about axes tangent to a common circle coaxial with the chuck body, each clamping jaw comprising an arm engageable with one radial member and a jaw engageable with a work piece, the arrangement being such that as the radial members are moved outwardly, the clamping jaws are swung about their pivots to engage the work piece and to press said work piece in rearwardly inclined directions toward the axis of the chuck body, against backing members fixed with respect to the chuck body.

A still further object of this invention is to provide a rugged and durable chucking device of the character described which shall be relatively inexpensive to manufacture, which shall be easy to assemble, which shall be sure and

2 positive in operation, and yet practical and efficient to a high degree in use.

Other objects of this invention will in part be obvious and in part hereinafter pointed out.

The invention accordingly consists in the features of construction, combinations of elements, and arrangements of parts, which will be exemplified in the construction hereinafter described, and of which the scope of invention will be indicated in the following claims.

In the accompanying drawings in which is shown various illustrative embodiments of this invention, Fig. 1 is a coaxial cross-sectional view of a chucking device embodying the invention and attached to the front end of a lathe spindle;

Fig. 2 is a front end view of the chucking device embodying the invention;

Fig. 3 is a cross-sectional view taken on line 3—3 of Fig. 1;

Fig. 4 is a perspective view of the operating cone;

Fig. 6 is a coaxial cross-sectional view of the chucking device and lathe spindle embodying the invention and illustrating a hydraulically operated modification of the invention.

Figure 5:
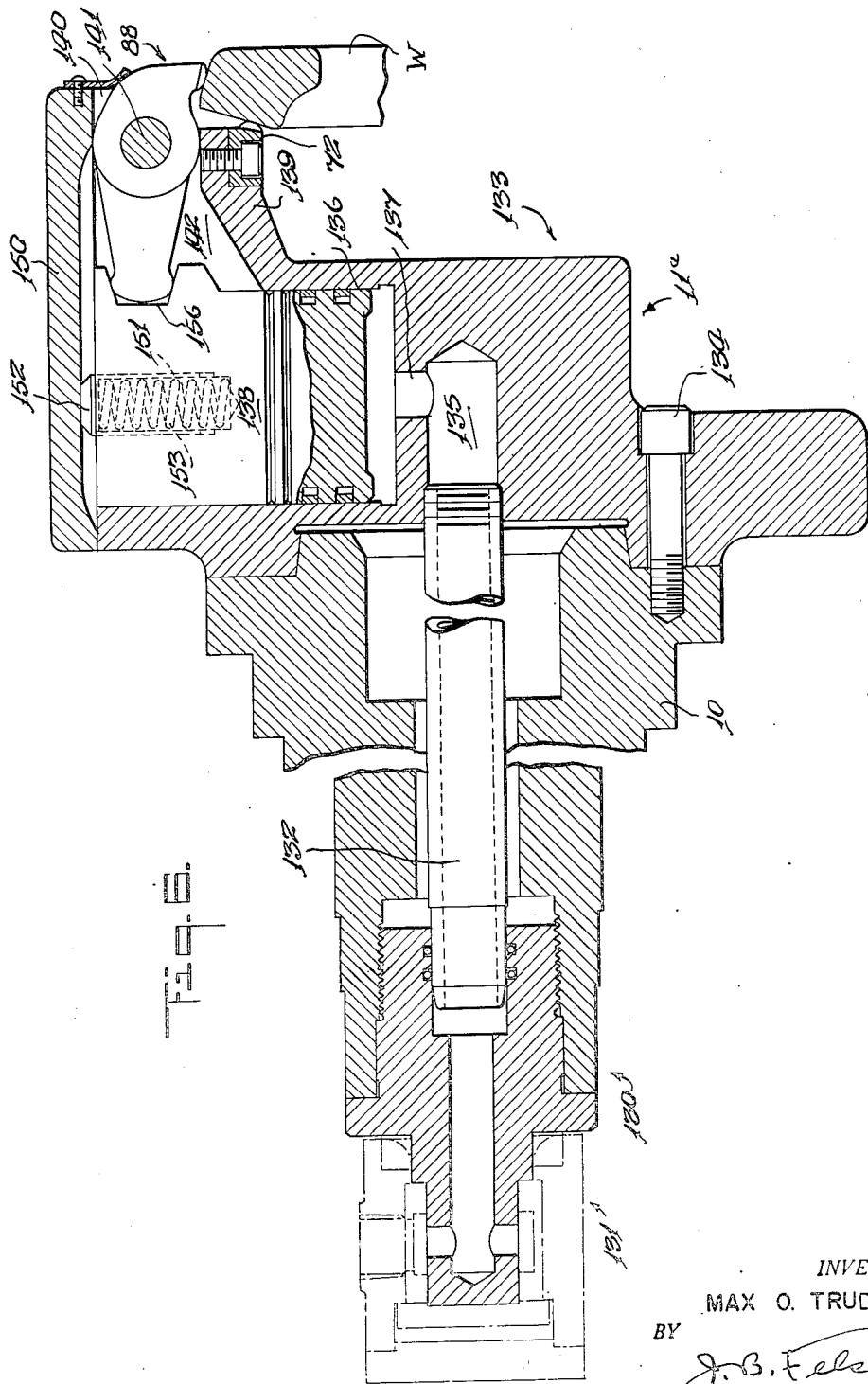
Fig. 5 is a perspective view of one of the radial cam members.

Referring now in detail to the drawing, 10 designates a spindle of a lathe to the forward end or nose of which is attached a chucking device 11, embodying the invention and controlled by a draw bar 13 passing through the spindle. The spindle 10 may be of usual construction. It has a coaxial through opening 14. At the forward end of the opening 14 is an enlarged socket 15. The spindle is provided adjacent its forward end with an outwardly extending annular flange 16. Surrounding the forward end of the recess or enlarged socket 15 is an annular flange 17 provided with a tapered outer surface 18.

The chucking device 10 comprises a chuck body 20. Said body 20 comprises an annular outwardly extending flange 21 formed with three equi-angularly spaced similar notches 22. Each notch 22 has a flat bottom surface 23. The surfaces 23 are tangent to a common circle. At the ends of each flat surface 23 are parallel end surfaces 24. Flange 21 has a rear surface 25 and a front surface 26, and an outer edge 27. Extending rearwardly from the annular flange 21 is an annular flange 27a having a rear surface 28. The surface 29 of the spindle surrounds the tapered surface 18. The flange 27 is formed with an internally tapered surface 30, which receives the tapered surface 18 of the spindle.

Said body 20 is furthermore formed with an axial through opening 31. Extending forwardly from the annular flange 21 is an annular sleeve portion or flange 33 formed with three equiangularly spaced similar radial slots 34 aligned with the three notches 22. At the forward end of the flange 33 is an annular shallow recess 35 for the purpose hereinafter appearing. Said forward end is formed with a plurality of screw threaded openings 36 parallel to the axis of the chuck body. Each slot 34 has a rear surface 37, parallel side surface 38 and a front surface 39.

Extending outwardly and forwardly from the flange 33 are web portions 41. Extending forwardly from the annular flange 21 and on opposite sides of each slot 34 are a pair of parallel walls 42, the lower ends of which are interconnected by the web 41. Each pair of parallel portions 42 have inner parallel spaced walls 43 disposed forwardly and above wall 39 of the slot 34. Forwardly of the surface 43 and spaced between the arms 42 is enlarged outwardly and forwardly curved surface 46 from which extends parallel surfaces 47. Thus the forward ends 48 of the arms 42 are spaced from each other and are disposed parallel to one another.

One of the arms 48 is formed with a through opening 49 and the other arm is formed with a through opening 49a formed with an internal shoulder 49b. The reduced portion of the opening 49a is screw threaded. The outer ends of the openings 49, 49a may be counterbored as at 50. The space between the arms 48 may be designated by the numeral 51. It will be seen that the spaces 51 are disposed radially outwardly of the webs 41. Each web 41 has an outer inclined surface 52, as shown in Fig. 1 of the drawing, and a flat outer end surface 53. Each web 41 has a front end surface 54 which is in the plane of the forward end surface 55 of the arms 48.

At the forward end of each web 41 is an arcuate end groove 56 comprising a flat inner surface 57 and a part-cylindrical outer surface 58. The outer surfaces of the arms 42 are in the cylindrical surface 27 of the flange 21. The notches 22 hence extend longitudinally through the arms 42 as well as through the flange 21. The portions of the flange 21 between the sides of arms 42 are formed with pairs of parallel through bolt openings 60 to receive bolts 61 screwed into threaded openings 62 in each flange 16 of the spindle. The openings 60 are counterbored to receive heads of the bolts and said bolts hence serve to fix the chuck body to the spindle.

It will be noted that the forward end of each web 41 is formed with three radial through screw threaded openings 54a. It will be noted furthermore that the flat bottom surface 23 of each notch 22 extends through the arms 42 from front to rear. The chuck body is formed with a plurality of screw threaded openings 66 extending inwardly from said surfaces 23 for the purpose hereinafter appearing.

Disposed within the annular groove 35 is a face cover or annular plate 70 attached to the front end of the flange 33 by means of screws 71 screwed into the threaded openings 36.

Disposed within each arcuate groove 56 is a back jaw 72. Each back jaw is arcuate and contacts the surfaces 57, 58 of the web 41. It is fixed to the web by means of screws 73 passing through suitable counterbored openings 74 in the back jaw and registering with the threaded openings 54a. Each back jaw 72 is formed at its front with two sets of teeth or serrations 75. The teeth all extend or are inclined in the driving direction of the spindle. The spaces between the teeth are inclined forwardly and radially outwardly and the outer edges of the teeth are preferably curved, as shown in Fig. 1 of the drawing.

Within each of the notches 22 is a rim cover 77 having an outer transversely curved surface 78 conforming to the outer curvature of surface 27. Said rim cover has parallel longitudinal edges fitting within the surfaces 24 of the notch 22. Said cover is formed with counterbored through openings 79 to receive screws 80 which attach rim cover to the chuck body. The inner surface of each rim cover may be recessed as at 81. It will be understood that each rim cover covers the spaces 51 and the slot 34 between each pair of parallel arms 42.

Extending through each pair of aligned openings 49, 49a is a clamping jaw pivot pin 83. Each pin 83 has a head 84 at one end received in one of the counterbored sockets 50. At the outer end of each pin 83 is a reduced screw threaded portion 85 screwed into the reduced screw threaded portion of the through opening 49a. The screws are extended to receive a lock nut 86 screwed thereto and received in the socket 50. Each clamping jaw pin 83 serves as a pivot for clamping jaw 88 and at the same time ties the two arms 48 together for added rigidity. Each pin 83 also serves as a spacer to provide proper side clearance for the clamping jaw 88. It will be noted that the pin 83 contacts the shoulder 49b to thereby space arms 48 from one another. Each clamping jaw 88 is in the form of a lever having an intermediate sleeve portion 89 formed with a through opening through which the pivot pin 83 passes. It will be noted that each pin 83 traverses the space 51 and each clamping jaw 88 is received between a pair of arms 48 and on the pivot pin 83.

Attached to the forward end of each rim cover 77 by means of screws 125 is a spring wiping plate 126 extending downwardly and contacting the lever. The wiping plate 126 serves to exclude dirt from the chuck.

Extending forwardly from each sleeve portion 89 is an arm 92 having at its outer end, a somewhat enlarged rounded head 93. Extending forwardly from each sleeve 89 is a projection 93a from which extends downwardly a jaw 94 formed at its lower end with a plurality of teeth or serrations 95. Serrations 95 are arranged along an arcuate curve. The spaces between the teeth are inclined forwardly and towards the axis of the chuck body. The outer edges of the teeth lie on a conical surface, the axis of which is the axis of the chuck body.

Slidably mounted in each slot 34 is a radial cam 100. Each of the cams 100 has a rear face 101 contacting face 37 of the slot 34. Each cam furthermore has parallel side surfaces 102 which contact the surface 38 of the slot. The cam has at its forward side a surface 104 contacting the surface 39 of the slot. Each cam furthermore has at its inner surface a rearwardly and inwardly tapered flat surface 105. The surfaces 105 of the three cams are tangent to a common cone coaxial with the chuck body. Each cam is furthermore provided at its outer end with a forwardly extending jaw 106 formed with a transverse slot 107 having tapering transverse surfaces 108 inclined rearwardly and toward each other. The rear heads 93 of the clamping jaws 88 are received in the slots 107. Each cam is furthermore formed with a radial socket or opening 110 in which is slidably fitted a cylindrical spring housing 111 closed at its outer end. Within each housing 111 is a coil compression spring 112 normally urging the spring housing radially outwardly toward the inner surface of the recess 81 of the rim cover 77.

Means is provided to move the cams 100 radially outwardly. To this end there is attached to the forward end draw bar 13 an axial operating cone 113. The operating cone 113 is disposed within the through opening 31 of the chuck body. It is formed with an axial through opening 114 countersunk at its forward end as at 115. Extending through the opening 114 is a bolt 116 the rear end of which is screwed as at 117 to the forward end of the draw bar. A spacer 118 surrounds the bolt 116 and is interposed between the draw bar and the operating cone. The cone 113 is formed with three equi-angularly spaced, similar slots 119 to receive the inner ends of the three respectively cams 100. Each slot 119 comprises a flat tapered surface 120 and parallel side surfaces 121. The surfaces 120 are complementary to the surfaces 105 of the cams. The cone 113 may slide axially within the opening 31. As the draw bar 13 pulls the cone 113 to the left, looking at Fig. 1, cam members 100 will be pushed radially outwardly, thereby compressing the springs 112. During such movement clamping jaws 88 are rocked in a clockwise direction about their pivot pins 83.

The work piece W, which is here shown for the purpose of illustration in the form of a gear blank, has an inner conical surface 125 which tapers inwardly and rearwardly. This tapered surface 125 is gripped by the teeth 75 of the back jaws 72. Each work piece further comprises an outer forwardly and inwardly tapering conical surface 126, and this surface is gripped by the teeth 95 of the clamping jaws. Thus as the cams 100 move radially outwardly, the clamping jaws are swung about their pivots and the teeth 95 exert force on the work piece radially and laterally at the same time, thereby enabling the work piece to be clamped across solid metal rather than exerting the total of the clamping force across the diameter of the work piece, and thereby eliminating distortion.

It will be noted that the back jaw 72 takes the thrust of the lateral clamping force. The serrations or teeth on the back jaws as well as the clamping jaws act to clamp the work piece as well as to rotate the work piece. When the draw bar 13 is moved to the right, looking at Fig. 1, the springs 112 will move the cams 100 radially inwardly to swing the clamping jaws out of engagement with respect to the work piece.

In Fig. 6 there is shown a lathe spindle 10 and a chucking device 11a embodying the invention and illustrating a modified construction. The chucking device 11a has hydraulic means for independently rotating each of the clamping jaws 88. Attached to the rear end of the spindle 10 is an adapter 130 and mounted on the rear end of the adapter 130 is a non-rotating conventional valve 131. Extending through the spindle is a tube 132 which communicates at its rear end with the adapter 130 so as to receive hydraulic fluid from the valve 131.

The chucking device 11a comprises a chuck body 133 attached to the forward end of the spindle as by bolts 134 and fitting onto the spindle in the conventional manner. The body 133 is formed with an axial opening 135 extending to the rear end thereof. The forward end of the tube 132 is screwed into the rear end of the opening 135. Said chuck body 133 is formed with three radial cylindrical bores 136 which communicate with the axial opening 135 through the radial opening 137. Within each bore 136 is a piston 138.

Extending from the body 133 and adjacent each bore 136 is a web 139 from which extends a pair of parallel side walls 140 carrying a transverse pivot pin 141. The space 142 outwardly of each web 139 and between each pair of arms 140 communicates with the outer end of each bore 136. Covering each space 142 of bore 136 is a rim cover 150 fixed in any suitable manner. Each cylinder 136 is formed with a radial opening 151 in which is a spring housing 152 pushed outwardly by a coil compression spring 153, against the rim cover 150.

Pivoted on each pin 141 is a clamping jaw 88 similar to that described hereinabove. Each jaw 88 engages within a slot 156 in one of the cylinders.

When hydraulic medium is pumped from valve 131 through the adapter 130, through tube 132 and opening 135 and passages 137 to the inner ends of bores 136, the pistons 138 will be moved radially outwardly to swing the jaws 88 into clamping engagement with the work piece W pressing the work piece against the back jaws 72, similar to the jaws shown in Fig. 1.

The advantage of such construction is that each cylinder 138 may move independently of the other, so as to take care of eccentric work pieces. Thus one cylinder may move outwardly to a greater extent than the other. When the valve 131 relieves the hydraulic pressure, the springs 153 move the cylinders 138 radially inwardly to relieve the work piece.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the acompanying drawings is to be interpreted as illustrative and not in a limiting sense.

Having thus described my invention I claim as new and desire to secure by Letters Patent:

1. A chucking device adapted to be attached to the nose of a spindle of a lathe, said chucking device comprising a chuck body, a plurality of radially moving members on the chuck body, levers pivoted to said chuck body and engaging said radial members, means to move the radial members radially to rotate said levers, and said levers having jaws adapted to engage an annular work piece for chucking the same, and back jaws fixed to the chuck body whereby the work piece may be pressed by the levers against said back jaws, said back jaws being formed with teeth to grip said work piece, and said lever jaws having forwardly and inwardly inclined teeth.

2. A chucking device adapted to be attached to the nose of a spindle of a lathe, said chucking device comprising a chuck body, a plurality of radially moving members on the chuck body, levers pivoted to said chuck body and engaging said radial members, means to move the radial members radially to rotate said levers, and said levers having means adapted to engage an annular work piece for chucking the same, and back jaws fixed to the chuck body whereby the work piece may be pressed by the levers against said back jaws, said back jaws being formed with teeth to grip said work piece, said levers being formed with teeth to grip said work piece.

3. A chucking device for a lathe comprising a chuck body, means to attach the chuck body to the nose of a lathe spindle, said chuck body being formed with a plurality of radial slots, a cam in each slot, a central cone member adapted to be moved axially for moving the cam members radially outwardly, levers pivoted to the chuck body about axes tangent to a common circle, each lever having an arm in engagement with one of the cam members, and spring means to move the cam members radially inwardly.

4. A chucking device comprising a chuck body, a plurality of radial members on the chuck body movable radially outwardly and inwardly relative to the axis of the chuck body, a lever for each radial member, each lever being pivoted about a pivot perpendicular to and spaced from the axis of the body, each lever having a rearwardly extending arm engaging one of said radial members and each lever having a forwardly and inwardly extending portion provided with gripping teeth, said gripping teeth being disposed on a conical surface coaxial with the chuck body and being inclined forwardly and inwardly.

5. A chucking device comprising a chuck body, a plurality of radial members on the chuck body movable radially outwardly and inwardly relative to the axis of the chuck body, a lever for each radial member, each lever being pivoted about a pivot perpendicular to and spaced from the axis of the body, each lever having a rearwardly extending arm engaging one of said radial members and each lever having a forwardly and inwardly extending portion provided with gripping teeth, said gripping teeth being disposed on a conical surface coaxial with the chuck body and being inclined forwardly and inwardly, and arcuate back jaws fixed to said chuck body and having gripping teeth inclined outwardly and forwardly.

6. A chucking device comprising a chuck body, means to attach the chuck body to the nose of a lathe spindle, said chuck body being formed with a plurality of radial slots and with a pair of spaced forwardly extending arms on opposite sides of each slot, each pair of arms being formed with aligned openings, a pivot pin passing through said aligned openings and interconnecting said arms, a lever pivoted to each pivot pin and disposed between said pair of arms, a cam member slidably mounted within each radial slot, means on each cam and lever to cause the lever to be rotated about its pivot pin upon moving said cam radially outwardly, means on said levers to exert pressure on an annular work piece in directions inclined rearwardly and towards the axis of the chuck body, upon being rotated by outward movement of said radial members, and means at the center of the chuck body to move said radial members outwardly.

7. A chucking device comprising a chuck body, means to attach the chuck body to the nose of a lathe spindle, said chuck body being formed with a plurality of radial slots and with a pair of spaced forwardly extending arms on opposite sides of each slot, each pair of arms being formed with aligned openings, a pivot pin passing through said aligned openings and interconnecting said arms, a lever pivoted to each pivot pin and disposed between said pair of arms, a cam member slidably mounted within each radial slot, means on each cam and lever to cause the lever to be rotated about its pivot pin upon moving said cam radially outwardly, means on said levers to exert pressure on an annular work piece in directions inclined rearwardly and towards the axis of the chuck body, upon being rotated by outward movement of said radial members, and means at the center of the chuck body to move said radial members outwardly, a cover plate attached to each pair of arms and covering one of the slots and overlying the radial member therein, and the lever on the pivot pin supported by said pair of arms, spring means interposed between each radial member and the cam member associated therewith for urging the radial member toward the axis of the chuck body.

8. A chucking device compising a chuck body, means to attach the chuck body to the nose of a lathe spindle, said chuck body being formed with a plurality of radial slots and with a pair of spaced forwardly extending arms on opposite sides of each slot, each pair of arms being formed with aligned openings, a pivot pin passing through said aligned openings and interconnecting said arms, a lever pivoted to each pivot pin and disposed between said pair of arms, a cam member slidably mounted within each radial slot, means on each cam and lever to cause the lever to be rotated about its pivot pin upon moving said cam radially outwardly, means on said levers to exert pressure on an annular work piece in directions inclined rearwardly and towards the axis of the chuck body, upon being rotated by outward movement of said radial members, and means at the center of the chuck body to move said radial members outwardly, a cover plate attached to each pair of arms and covering one of the slots and overlying the radial member therein, and the lever on the pivot pin supported by said pair of arms, spring means interposed between each radial member and the cam member associated therewith for urging the radial member toward the axis of the chuck body, and a wiping plate attached to each cover member and having wiping engagement with the lever associated therewith.

9. A chucking device comprising a chuck body, means to attach the chuck body to the nose of a lathe spindle, said chuck body being formed with a plurality of radial slots and with a pair of spaced forwardly extending arms on opposite sides of each slot, each pair of arms being formed with aligned openings, a pivot pin passing through said aligned openings and interconnecting said arms, a lever pivoted to each pivot pin and disposed between said pair of arms, a cam member slidably mounted within each radial slot, means on each cam and lever to cause the lever to be rotated about its pivot pin upon moving said cam radially outwardly, means on said levers to exert pressure on an annular work piece in directions inclined rearwardly and towards the axis of the chuck body, upon being rotated by outward movement of said radial members, and means at the center of the chuck body to move said radial members outwardly, a cover plate attached to each pair of arms and covering one of the slots and overlying the radial member therein, and the lever on the pivot pin supported by said pair of arms, spring means interposed between each radial member and the cam member associated therewith for urging the radial member toward the axis of the chuck body, and a wiping plate attached to each cover member and having wiping engagement with the lever associated therewith, and back jaws fixed to the chuck body whereby the work piece may be pressed by the levers against said back jaws.

10. A chucking device comprising a chuck body, means to attach the chuck body to the nose of a lathe spindle, said chuck body being formed with a plurality of radial slots and with a pair of spaced forwardly extending arms on opposite sides of each slot, each pair of arms being formed with aligned openings, a pivot pin passing through said aligned openings and interconnecting said arms, a lever pivoted to each pivot pin and disposed between said pair of arms, a cam member slidably mounted within each radial slot, means on each cam and lever to cause the lever to be rotated about its pivot pin upon moving said cam radially outwardly, means on said levers to exert pressure on an annular work piece in directions inclined rearwardly and towards the axis of the chuck body, upon being rotated by outward movement of said radial members, and means at the center of the chuck body to move said radial members outwardly, a cover plate attached to each pair of arms and covering one of the slots and overlying the radial member therein, and the lever on the pivot pin supported by said pair of arms, spring means interposed between each radial member and the cam member associated therewith for urging the radial member toward the axis of the chuck body, and means on said pivot pins to space said arms to provide proper clearance for the levers.

11. A chucking device for chucking annular work pieces, said chucking device comprising a chuck body adapted to be attached to the nose of a lathe spindle, a plurality of fixed back jaws on said body, said back jaws being curved and lying in a common circle coaxial with the body, a plurality of levers pivoted to the chuck body about axes tangent to a common circle coaxial with the body, means to simultaneously rotate said levers, said levers having at their forward ends curved jaws lying in a common circle coaxial with the body, and formed with gripping teeth inclined forwardly and towards the axis of the body.

12. A chucking device comprising a chuck body adapted to be attached to the nose of a lathe spindle, a plurality of levers pivoted to the body about axes tangent to a common circle coaxial with said body, each of said levers having a rearwardly extending arm and a forwardly extending arm, the forwardly extending arms of said levers having jaws offset inwardly toward the axis of the body and formed with curved gripping means inclined forwardly and towards the axis of the body and disposed on a common circle of smaller diameter than the circle to which the lever axes are tangent, and a plurality of back jaws fixed to the body and disposed rearwardly of the levered jaws, said back jaws being curved and lying in a common circle coaxial with the body and of a diameter less than the diameter of the levered jaws, and means engaging the rearwardly extending arms of said levers for swinging the levers to move the gripping jaws on the levers simultaneously toward the axis of the body and toward the back jaws, for chucking an annular work piece between the levered jaws and the back jaws.

MAX O. TRUDEAU.

REFERENCES CITED

The following references are of record in the file of this patent:

UNITED STATES PATENTS

| Number | Name | Date |
|---|---|---|
| 8,793 | Pratt | July 8, 1879 |
| 292,685 | Schrader | Jan. 29, 1884 |
| 1,075,756 | Bryant | Oct. 14, 1913 |
| 1,292,735 | Elliot | Jan. 28, 1919 |
| 1,479,604 | Horton | Jan. 1, 1924 |
| 1,813,705 | Lewis | July 7, 1931 |
| 2,460,889 | Larsen | Feb. 8, 1949 |
| 2,481,684 | Rock | Sept. 13, 1949 |
| 2,521,320 | Ashton | Sept. 5, 1950 |

FOREIGN PATENTS

| Number | Country | Date |
|---|---|---|
| 285,589 | Germany | Apr. 24, 1914 |